(12) United States Patent
Stone

(10) Patent No.: US 10,964,081 B2
(45) Date of Patent: Mar. 30, 2021

(54) DEFORMATION MESH CONTROL FOR A COMPUTER ANIMATED ARTWORK

(71) Applicant: Adobe Inc., San Jose, CA (US)

(72) Inventor: William Amir Stone, Seattle, WA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/853,367

(22) Filed: Apr. 20, 2020

(65) Prior Publication Data
US 2020/0250873 A1   Aug. 6, 2020

Related U.S. Application Data

(63) Continuation of application No. 16/196,616, filed on Nov. 20, 2018, now Pat. No. 10,643,365.

(51) Int. Cl.
*G06T 13/20* (2011.01)
*G06T 19/20* (2011.01)
*G06T 17/20* (2006.01)
*G06T 13/80* (2011.01)

(52) U.S. Cl.
CPC .............. *G06T 13/20* (2013.01); *G06T 13/80* (2013.01); *G06T 17/20* (2013.01); *G06T 19/20* (2013.01)

(58) Field of Classification Search
CPC .......... G06T 13/20; G06T 13/80; G06T 17/20
See application file for complete search history.

(56) References Cited

U.S. PATENT DOCUMENTS

| 6,437,784 B1 * | 8/2002 | Bentley | G06T 13/20 345/473 |
| 7,324,121 B2 * | 1/2008 | Young | G06T 19/20 345/650 |
| 7,928,985 B2 * | 4/2011 | Goldfarb | G06T 13/40 345/473 |
| 8,300,055 B2 | 10/2012 | Niles et al. | |
| 8,902,236 B1 | 12/2014 | Cohen Bengio et al. | |

(Continued)

OTHER PUBLICATIONS

Adobe, "After Effects Help/Animating With Puppet Tools", available at https://web.archive.org/web/20140310051959/https://helpx.adobe.com/after-effects/using/animating-puppet-tools.html#puppet-starch-controls>, Mar. 2014, pp. 1-7.

(Continued)

*Primary Examiner* — Terrell M Robinson
(74) *Attorney, Agent, or Firm* — F. Chau & Associates, LLC

(57) ABSTRACT

A user interface for animating digital artwork includes a two-part control to change scale, rotation, and/or shear. A stationary portion is manipulated by the user while a moveable portion moves during manipulation to reflect a deformation position resulting from the control For example, a system may store an artwork having a tessellated mesh bounded by an alpha edge and a bend handle associated with at least a first vertex of the mesh. The system also includes a user interface that implements a control for the bend handle. The control includes a stationary portion enabling the user to select a control value for the bend handle and a moveable portion that moves, during a manipulation event of the stationary portion, to a deformed position determined from the control value and from a position of at least one other handle associated with at least a second vertex of the vertices.

19 Claims, 6 Drawing Sheets

(56) References Cited

U.S. PATENT DOCUMENTS

| | | |
|---|---|---|
| 10,482,646 B1 | 11/2019 | Dalstein et al. |
| 2005/0231510 A1 | 10/2005 | Santos |
| 2006/0290693 A1 | 12/2006 | Zhou et al. |
| 2008/0192049 A1 | 8/2008 | Schiwietz et al. |
| 2008/0218512 A1 | 9/2008 | Alon |
| 2009/0002376 A1* | 1/2009 | Xu .................. G06T 13/40 345/473 |
| 2009/0080801 A1* | 3/2009 | Hatfield .............. G06T 11/60 382/283 |
| 2013/0088491 A1 | 4/2013 | Hobbs et al. |
| 2013/0093709 A1* | 4/2013 | Fujibayashi ........ G06F 3/0488 345/173 |
| 2013/0135305 A1 | 5/2013 | Bystrov et al. |
| 2015/0026618 A1 | 1/2015 | Stone |
| 2017/0098326 A1 | 4/2017 | Wampler |
| 2018/0005455 A1 | 1/2018 | Wenzel et al. |
| 2019/0251730 A1* | 8/2019 | Cao .................. G06T 13/80 |

OTHER PUBLICATIONS

"Animating with Puppet tools", downloaded from https://helpx.adobe.com/after-effects/using/animating-puppet-tools.html, Nov. 12, 2018, 19 pages.

U.S. Appl. No. 16/196,616, filed Nov. 20, 2018, Allowed.

\* cited by examiner

DEFORMATION MESH CONTROL FOR A COMPUTER ANIMATED ARTWORK

RELATED APPLICATION

This application is a continuation of, and claims priority to, U.S. application Ser. No. 16/196,616, filed Nov. 20, 2018, titled "A Deformation Mesh Control For A Computer Animated Artwork," the disclosure of which is incorporated herein.

TECHNICAL FIELD

This description relates to a novel control for animating a digital artwork.

BACKGROUND

Existing animation software applications allow users to animate two-dimensional or three-dimensional images including character and other similar artwork by placing handles on the artwork and then moving these handles. The software application determines how to smoothly deform the rest of the artwork based on the handle movements. In this way, a user is able to animate the artwork by controlling the position of the handles, i.e., moving the handles.

Deforming the artwork based on the movement of the handles is accomplished by generating a mesh of triangles with vertices inside of an alpha edge for the artwork. The alpha edge represents the outline of the artwork being animated, and the mesh is generated within the alpha edge. A handle may be placed by a user, using a user interface of the software application. The mesh is generated as a result of new handles placed, with each handle residing on a single vertex of the mesh. As more handles are placed, the software application may increase the density of the mesh in the area between handles to provide finer control of the deformation. The mesh edges are weighted relative to the handles using a gradient function. Thus, the closer a handle is to a particular edge of the mesh the more the constraints of that handle (e.g., the position) affects the mesh.

Some software applications include different types of handles. One type of handle is a position handle that enables the user to move the handle to a new position. If not moved by the user the user drags the handle to a new position), the position remains fixed and is not affected by constraints of other handles. This may cause the mesh to deform (stretch, bend, etc.) between the two handles. Some position handles may enable the user to not only move the handle (e.g., change the position), but also scale and rotate the handle. Increasing the scale of a position handle may make the area of the triangles around this handle larger and decreasing the scale may make the area of the triangles smaller. A rotation for such a handle rotates the mesh (and the alpha edge) around that handle's position. Another type of handle is a rigid handle that may be used to fix or make rigid a portion of the artwork. Once a rigid handle is placed in the mesh the user has no further interaction with the handle, but its presence makes the mesh surrounding the rigid handle resistant to deformation. For example, changing the position and rotation of a nearby position handle may cause the rigid handle to move (change position), scale and/or rotate (in order to minimize deformation), and may drastically deform the mesh surrounding any nearby handles automatically.

SUMMARY

Implementations provide a novel handle, referred to as a bend handle, and corresponding user interface control that enables the user to provide scale and rotation constraints for a handle and have the system calculate the position of the handle. The handle is unique because the position of the handle is dynamic; calculated based on the rotation and scale constraints and the position of the other handles, minimizing deformation of the mesh. Allowing the position of the bend handle to be calculated dynamically produces more realistic animation with less artificial stretching using fewer constraints and manipulation from the user. This decreases the time to produce an expressive animation, especially for kinematic joints and for simulating three-dimensional (3D) effects in two-dimensional (2D) animations.

Thus, implementations include a novel handle control with two portions; a stationary portion and a moveable portion. The user interacts with the stationary portion to select a rotation and/or scale for the handle during a manipulation event and the moveable portion moves around the display, with the deformed mesh, to illustrate the position of the handle resulting from the rotation and scale constraints. The stationary portion remains centered at the initial position in the user interface, i.e., the position the handle had before the manipulation event, although the stationary control may rotate, expand, or contract to indicate changing constraints. The two-part user interface provides an intuitive and precise control that allows the user to see how the mesh responds without interfering with the portion of the control that the user is interacting with, or resulting in inaccurate constraint due to a feedback loop.

The details of one or more implementations are set forth in the accompanying drawings and the description below. Other features will be apparent from the description and drawings, and from the claims.

DETAILED DESCRIPTION

Figure 1:
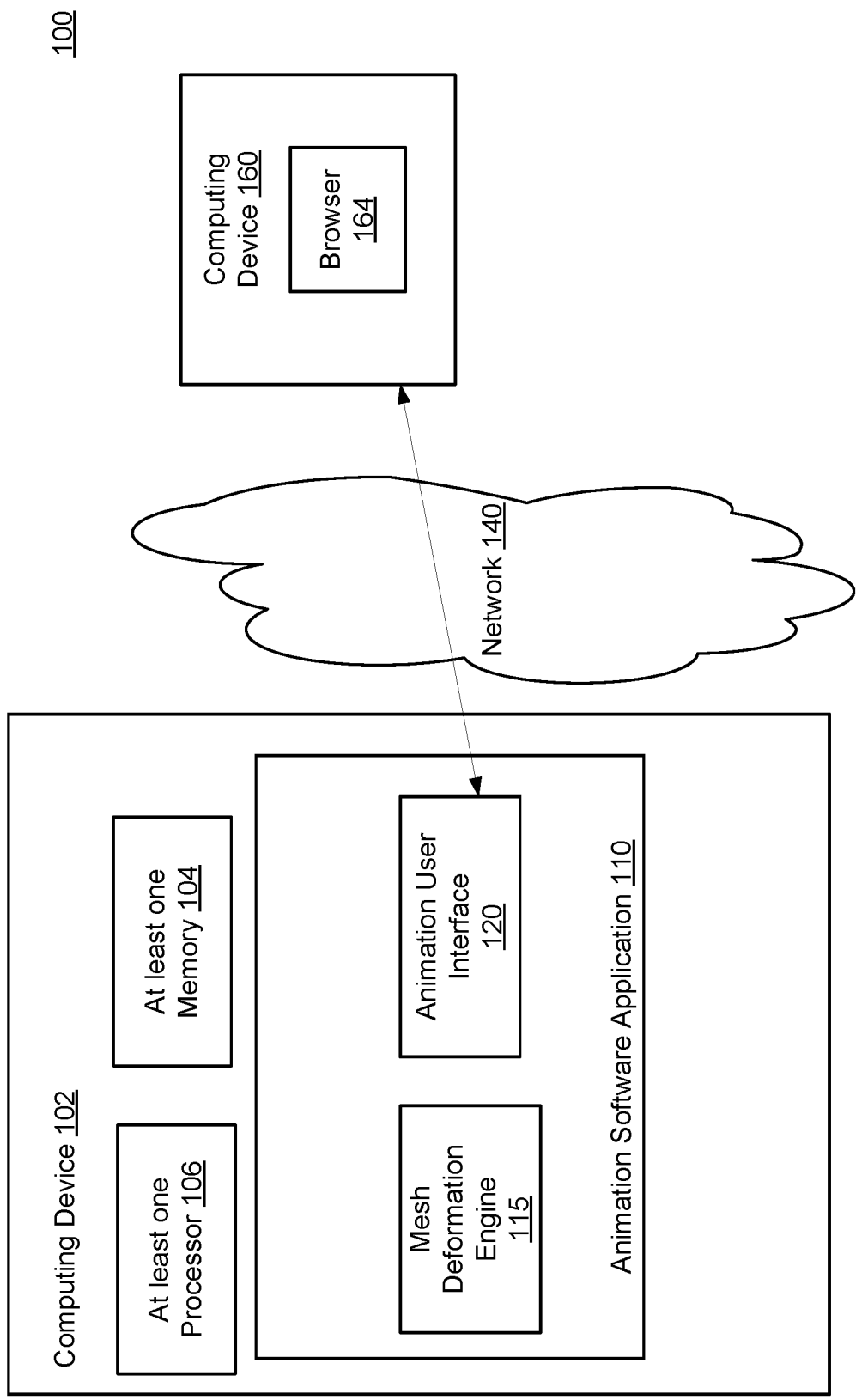
FIG. 1 is a block diagram of an animation system, according to an implementation.

Systems and methods provide a two-part control for a handle placed on a mesh of a digital artwork. The two-part control enables a user to change the scale, shear, and/or rotation associated with the handle, while the position of the handle is calculated dynamically based on a minimization of mesh deformation with respect to the scale, shear, and/or rotation as well as constraints represented by other handles of the mesh. Because the position of the handle can change during the rotation, shearing, and/or scaling, the novel handle, referred to as a bend handle, provides a unique user interface challenge. If the control for the handle moves with each user manipulation (e.g., mouse movement) to adjust rotation, shear, or scale, the initial position for calculating the scale and rotation delta from the previous manipulation moves. This makes it difficult to interact with the input device (e.g., predict mouse movement) and can also introduce a feedback loop, i.e., the manipulation (e.g., the movement of the mouse) causes a shift in the initial position for the next interaction, which changes the current delta for the rotation/scale/shear calculation, which in turn changes the initial position, etc.

Implementations thus provide a bend handle control with two portions; a stationary portion and a moveable portion. The user interacts with the stationary portion during a manipulation event and the moveable portion moves around the display with the mesh to indicate the dynamic position for the bend handle calculated based on the manipulation of the static portion and minimization of mesh deformation with respect to constraints represented by other handles of the mesh. The two-part bend handle control provides precise control in an intuitive fashion that prevents the feedback loop and provides a predictable input device movement.

Conventional mesh transformation tools use control points (handles) to specify the desired position of a particular part of the digital artwork. But conventional handles make it difficult to modify the mesh without introducing artificial stretching in the mesh and make it hard to isolate specific deformations. For example, a user using conventional tools to animate a tail wagging (rotation) in a digital artwork that is also moving across the display must individually provide rotation and position constraints for multiple handles, making sure to positionally correlate the movement of the handles in addition to controlling the rotational deformation. This is a time consuming and error-prone process. In contrast, the bend handle provides an intuitive control that enables a user to create twist and bloat effects without having to animate the position directly. This type of control is useful to animate forward kinematic limbs (tails, tentacles, and other extremities) and enables the user to animate perspective-like changes, e.g., simulating slight head turning. Moreover, the resulting animations appear more natural and organic and do not require the user to try and achieve positional correlation.

As used herein, a digital artwork refers to any electronic image, photograph, video frame, or other graphic either vector or raster displayed on a display of an electronic device. Artwork may depict an object such as a person, building, car, plane, ship, plant, or any other object. Artwork may also depict an abstract set of pixels such as a background, texture, or landscape. A digital artwork has an alpha boundary edge. As used herein an alpha edge is the outline of an object depicted in the artwork. In some implementations, the artwork is 2D and has a transparent background and the edge of the object is a border between the transparent background and the remainder of the artwork. In some implementations, the alpha edge may be specified or identified by a user. In some implementations, the artwork is 3D and the alpha edge may be the outer edge of a wire frame or other 3D model.

Figure 2:
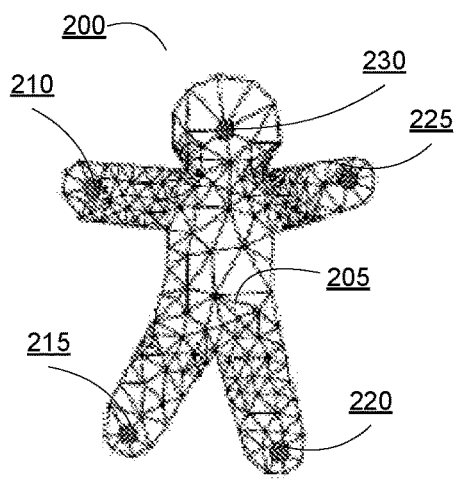
FIG. 2 illustrates the tessellated image of a digital artwork with user positioned handles.

As used herein, a handle refers to an item positioned relative to artwork to control animation of the artwork. A user or automated process moves the handle to a new position and an animation is determined based on the movement of the handle from the initial position to the moved position. A handle can affect a single point, a line segment, an area, or a combination of points, line segments, and areas within the mesh. In some implementations, a handle is associated with a vertex in the mesh. In some implementations, a handle is associated with more than one vertex in the mesh. In some implementations, a new mesh is generated for the artwork every time a new handle is placed on the artwork, with each handle being associated with a respective vertex (or vertices) in the generated mesh. In some implementations, a handle may be placed on a vertex or vertices of an existing mesh. A handle has an associated position constraint. The position constraint may be interactive or dynamic. A position constraint that is interactive is able to be set by the user. A position constraint that is dynamic is determined by the animation software application based on proximity to other handles, the constraints of those handles, and minimization of mesh deformation. Some handles may also have an associated scale. Some handles may have an associated rotation. Some handles may have an associated shear. Placing any handle on the digital artwork causes the software application to generate a tessellated mesh within the alpha edge. The mesh is a series of triangles, with the triangles abut at their vertices and edges. FIG. 2 illustrates an example digital artwork 200 with a tessellated mesh 205. The digital artwork 200 includes five handles 210, 215, 220, 225, and 230. Placement of the handles 210 to 230 on the artwork may cause the software application to make the mesh denser around the handles when in close proximity to other handles, as illustrated, e.g., in the areas around handles 210 and 225. This enables the software application to deform the mesh with more precision and less stretching in response to movement of the handles.

As used herein the phrase "smooth deformation" refers to a deformation based on manipulating a mesh in a way that avoids any visible edges at the junction of the triangles of the mesh within constraints provided by the handles. Smooth deformation can also be referred to as minimizing deformation. An example method of determining smooth mesh deformation in response to movement of handles is provided in U.S. Patent Publication No. 2017/0098326, which is incorporated herein by reference.

As used herein, a bend handle is a type of handle where the user can specify a control value, i.e., a rotation value, a scale value, and/or a shear value, for the handle but not a position value. The position value of a bend handle is dynamic, or in other words calculated based on the specified rotation and scale values for the handle and the smooth deformation of the mesh relative to other handles for the artwork. As used herein a control value is a rotation value, a scale value, and/or a shear value for a bend handle.

As used herein, a bend handle control is a user interface element that enables the user to specify the control value, e.g., rotation, scale, and/or shear, of a bend handle by interacting with the bend handle control during a manipulation event, while also showing the user the dynamic position of the bend handle calculated based on the rotation, shear, and scale.

As used herein, a manipulation event is defined by the user selecting, manipulating, and releasing a handle control. An example manipulation event may be a user performing a click-drag-release on the bend handle control using an input device such as a mouse, trackball, touch screen, multi-touch screen etc.

The bend handle control includes a stationary portion and a moveable portion. As used herein, the stationary portion is stationary with respect to the initial position during a manipulation event. The initial position of a bend handle represents the position constraint of the bend handle prior to the manipulation event. Put another way, during a single manipulation event the stationary portion does not change position on the display. The position of any handle is represented in display coordinates. The stationary portion of the bend control handle may rotate around, expand from, or contract to the initial position, but remains anchored on the initial position until after the manipulation event. The stationary portion may be rotated. In some implementations, the stationary portion may have a selectable portion that can be rotated. For example, the stationary portion may be a ring and may include a small box positioned on the ring that can be selected and dragged around the ring by the user. Such interaction of the user with the stationary portion enables the user to specify a rotation value for the bend handle. The rotation value may also be referred to as a rotation constraint. In some implementations, the stationary portion may be a slide bar or a rotation dial. In some implementations, the stationary portion can be expanded or contracted from the initial position.

In some implementations, the stationary portion may have a selectable portion used to expand or contract the stationary portion. Expanding and contracting interactions enable the user to specify a scale value for the bend handle. The scale value may also be referred to as a scale constraint. For example, the stationary portion may be a ring that gets bigger, or has a representation such as a dashed ring (also referred to as a shadow), that gets bigger during a manipulation away from the initial position of the ring. For example, a mouse click-and-hold event on the ring and dragging the ring away from the center (e.g., away from the initial position) may enlarge the ring or enlarge a shadow of the ring, which in turn increases the scale value for the bend handle. As another example, the user may contract the ring or a shadow of the ring as the mouse moves toward the center of the ring, decreasing the scale value for the bend handle. In some implementations the scale value can be inverted (become negative) or can be capped to minimum values. In some implantations, the stationary portion may be rotated and scaled during the same manipulation event. Thus, while the stationary portion of the bend control may rotate, expand, and/or contract, such movement may not change the position of the stationary portion of the control on the display. Thus, the stationary portion is stationary with respect to the initial position of the bend handle during a manipulation event.

In some implementations, the stationary portion may be manipulated to provide a shear value for the bend handle. The shear value may also be referred to as a shear constraint. In some implementations, the shear constraint may include an amount of shear and an angle defining the direction the shear is applied. In some implementations, the user may drag the selectable portion laterally to the shear direction to provide a shear amount. For example, the stationary portion may have a selectable portion manipulated in a vertical manner to provide a vertical axis shear constraint. As another example, the stationary portion may have a selectable portion manipulated in a horizontal manner to provide a horizontal axis shear constraint. In some implementations, the stationary portion may have a selectable portion to rotate the shear angle to define the direction that the shear value is applied. In some implementations, a shear value and shear angle may be provided by multi-touch, e.g., by moving one finger laterally away from two other fingers. The stationary portion may include a representation such as a dashed line or parallelogram (also referred to as a shear shadow), that changes during a manipulation to show the shear angle and amount.

As used herein, a moveable portion of the bend handle control is a portion of the bend handle control that is initially located at the initial position of the bend handle but moves from the initial position to a deformation position or positions calculated during a manipulation event, and is thus separable from the stationary portion. The moveable portion cannot be interacted with during a manipulation event. Put another way, the user cannot click-and-drag the moveable portion of the bend handle control. Instead, the moveable portion is repositioned on the display based on the smooth deformation of the mesh resulting from manipulation of the stationary portion, or any other means (e.g., a text box) to manipulate the control values by the user. For example, when a user manipulates, i.e., rotates, slides, expands, or contracts, the stationary portion, the system uses the shear, rotation and/or scale values represented by the manipulation, i.e., the control value(s), to calculate a new position for the bend handle and moves the moveable portion to the new position. This occurs repeatedly during the duration of a manipulation event, so that the moveable portion repeatedly moves to a new dynamically calculated deformation position. The deformation position is determined with respect to the presence of other handles in the mesh (if any) and the control values modified by the manipulation. In other words, the rotation of a bend handle is a rotation not around the initial position of the bend handle but a rotation that solves for minimal deformation relative to all other handles on the mesh, if any. The system minimizes deformations of the mesh with respect to these position, rotation and scale constraints over the entire mesh. When the user completes the manipulation event, e.g., by releasing the mouse button or terminating a touch with a touch screen, the stationary portion snaps to moveable portion. In some implementations, if the stationary portion was enlarged during the manipulation event, the system may return the stationary portion to its default size when the stationary portion snaps to the new position.

Details of the systems and techniques are discussed below with respect to the illustrated figures. FIG. 1 is a block diagram of an animation system 100. The system 100 includes a computing device 102 having at least one memory 104, at least one processor 106. The system 100 includes one or more software applications, such as animation software application 110. In some implementations, the computing device 102 may communicate with one or more other computing devices, e.g., computing device 160 over a network 140. In such implementations a user may use computing device 160, e.g., via a browser 164, to access the animation software application 110. In some implementations, a user may directly access animation software application 110 using input and output devices of computing device 102 (not shown). In such an implementation no network 140 is needed to access the animation software application 110. Thus, the computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple distributed computing devices in communication with one another, such as multiple servers in communication with one another being utilized to perform its various functions over a network.

The at least one processor 106 may represent two or more processors formed in a substrate on the computing device 102 executing in parallel and utilizing corresponding instructions stored using the at least one memory 104. In some implementations, the at least one processor 106 may include a specialized processor, e.g. a graphics processing unit (GPU). The at least one memory 104 represents a non-transitory computer-readable storage medium. Of course, similarly, the at least one memory 104 may represent one or more different types of memory utilized by the computing device 102. The at least one memory 104 stores instructions, e.g., in the form of software applications such as software application 110, which allow the at least one processor 106 to implement disclosed embodiments. The at least one memory 104 may also be used to store data, such as digital artwork, handle attributes, etc., used by the software applications.

The system 100 may include animation software application 110. The animation software application 110 enables a user to animate a digital artwork using handles. Examples of animation software application 110 can include, but are not limited to programs such as AFTER EFFECTS by Adobe, NUKE by Foundry, HOUDINI by Side Effects Software, FUSION by BlackMagic, MOTION by Apple, BLENDER by Blender Foundation, HITFILMS by FxHome, MAYA by Autodesk, etc. In some implementations, the software application 110 may include components, such as animation user interface 120 and mesh deformation engine 115, that provide an easy way for a user to manipulate a digital artwork in a manner somewhat similar to how one might manipulate a doll or a figure made of clay. For example, the software application 110 may enable the user to specify a number of handles on the artwork. These handles can be dragged around by the user, with the rest of the artwork deforming so that the result looks "natural" while ensuring that each handle goes where the user dragged it.

To achieve the "natural" look, transformations for the vertices of the mesh are determined in an iterative manner based on gradient blending. In some implementations, when a handle is placed on the digital artwork, the software application 110 may generate (or regenerate) a tessellated mesh. In such implementations a vertex in the mesh is generated for each handle placed on the artwork, in addition to other vertices. Thus, each handle is associated with the vertex generated for the handle. In some implementations, when a handle is placed on the digital artwork, the software application may associate the handle with a particular vertex in a previously generated mesh. The software application 110 then applies a gradient to the mesh. The gradient ensures that vertices closest to the handle are highly affected by the constraints (e.g., position, shear, scale, and/or rotation) of the handle; The further an vertex is from the handle the less it is affected by that handle and the more it is affected by other nearer handles. In the absence of other handles nearby, a vertex will adopt the constraints of the nearest handle entirely (e.g., the mesh vertex is near the alpha boundary with only one constraint nearby). Any particular vertex may be affected by multiple handles. For example, a vertex equidistant between two handles may be controlled 50% by one handle and 50% by the other handle. Position is a constraint for handles where the user provides the position, or in other words where the position is interactive. Put another way, when position is a constraint for a handle, if the user does not provide a new position the handle does not move and the vertices closest to the handle are highly resistant to movement. A handle with a dynamic position is free to move. In other words, position is not a constraint for a handle with a dynamic position. Similarly, a handle where the scale is set by the user has scale as a constraint, meaning that the vertex most affected by the handle will comply with the scale value more than vertex further from the handle. Likewise, a handle where the rotation is set by the user has a rotation constraint, meaning that the vertices of the mesh most affected by the handle will rotate more than vertices less affected by the handle. In the same way, a handle where the shear is set by the user has a shear constraint. The mesh deformation engine 115 iteratively determines a minimal deformation for each edge that complies with the constraints specified by the user. As indicated earlier, U.S. Patent Publication 2017/0098326 provides an example of operations performed by a mesh deformation engine 115, although implementations may use other similar or later developed techniques.

Figure 3:
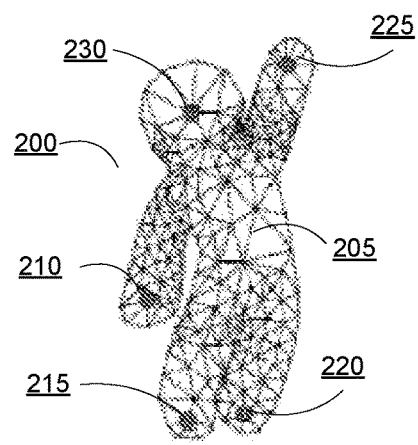
FIG. 3 illustrates deformation of the artwork of FIG. 2 based on movements of the handles.

FIG. 2 illustrates a digital artwork 200 with five handles 210-230 associated with the artwork 200. FIG. 2 also illustrates the tessellated mesh 205 generated for the artwork 200. The handles 210-230 of the artwork 200 are positionable by the user. In other words, a user may click-and-drag any of the handles 210-230 to a new location, as illustrated in FIG. 3. The new location is referred to as a deformed position. When the user changes the position of any of the handles 210-230, the mesh deformation engine 115 calculates a mesh deformation that minimizes deformation within the constraints set by the user. In FIG. 3 the position constraint rotates and scales the handle automatically in order to minimize deformation. Thus FIG. 2 and FIG. 3 illustrate the change in the alpha edge and the mesh due to position constraints set by the user. If the artwork 200 of FIG. 2 represents a first keyframe and the artwork 200 of FIG. 3 represents a second keyframe, the animation software application 110 generates frames in between that will animate the artwork, e.g., so it transitions smoothly from the first keyframe to the second keyframe by interpolating the position, rotation, scale, and/or shear of each handle according to their automatic and user defined constraints.

The animation software application 110 may also include an animation user interface 120. The animation user interface 120 may provide a display of the digital artwork to the user as well as provide controls for setting keyframes, placing handles, changing the attributes of handles, interacting with the handles via handle controls, saving changes to the artwork, providing constraints via text controls (e.g., a text box), etc. Conventionally, a user places a handle on the artwork and the animation user interface 120 provides a handle control that enables the user to interact with the handle when the handle has focus. When the user selects the handle, the user may change attributes of the handle, for example naming the handle or changing the type of the handle. Selecting the handle control may also enable the user to delete the handle. The animation user interface 120 may also enable the user to interact with the handle. For some handles, interaction may be moving the handle, or in other words specifying a position for the handle. The position may be specified using display coordinates. Thus, the vertex associated with the handle does not change when the position changes. Before a manipulation event the position of the handle is referred to as the initial position. During a manipulation event, the position of the handle is referred to as a deformed position. Thus, a manipulation event may cause a handle to move from an initial position to a deformed position. The initial position has different display coordinates than the deformed position. For some handles, interaction may include specifying a rotation value for the handle. The rotation value represents a twist of the mesh. For some handles, interaction may include specifying a scale for the handle. The scale makes the mesh around the handle larger in area or smaller in area, depending on the scale and the gradient, e.g., how much the mesh vertices are affected by the handle.

The animation user interface 120 provides a handle control for each handle, once the handle has focus, e.g., as a result of the user clicking on or touching the handle. A handle control enables the user to set the position, rotation, shear, or scale of the handle, as appropriate, during a manipulation event. For example, a position handle control enables the user to move the handle from an initial position to a deformation position during a manipulation event, e.g., to click-and-drag the handle from one set of coordinates to another. During the manipulation event, the animation software application 110 determines a smooth deformation caused by the changing position and displays the deformation of the artwork on the display.

Implementations of the animation user interface 120 provide a bend handle control. The bend handle control allows the user to specify a control value(s) (e.g., rotation, shear, and/or a scale) for the handle but does not allow the user to set a position for the handle. Instead, the bend handle control includes a moveable portion that indicates the dynamic position of the handle calculated based on the specified control value(s) and smooth mesh deformation. In other words, the moveable portion indicates the deformed position of the handle, which is dynamically calculated during the manipulation event. Thus, the bend handle control includes two portions, a stationary portion and a moveable portion. As discussed above, the bend handle presents a unique user interface challenge, as the position dynamically changes during a manipulation event. If the bend handle control were to move with the position, this would result in difficulty in determining what rotation/scale/shear value the user is trying to specify and interfere with calculating a change delta (e.g., from the previous mesh deformation output to the display). Put another way, it would be difficult to determine what movement was due to the movement of the input device and what movement was due to the change in position. If the bend handle control remains stationary, e.g., at the initial position, the animation software application cannot display the changes in the mesh caused by the user-specified control values. To solve these issues, the bend control incorporates a stationary component that the user can interact with during a manipulation event and a moveable component that illustrates the current position of the handle, i.e., the position of the handle based on the smooth deformation of the mesh resulting from the rotation and/or scale value provided by the user and the constraints of other handles.

Figure 4:
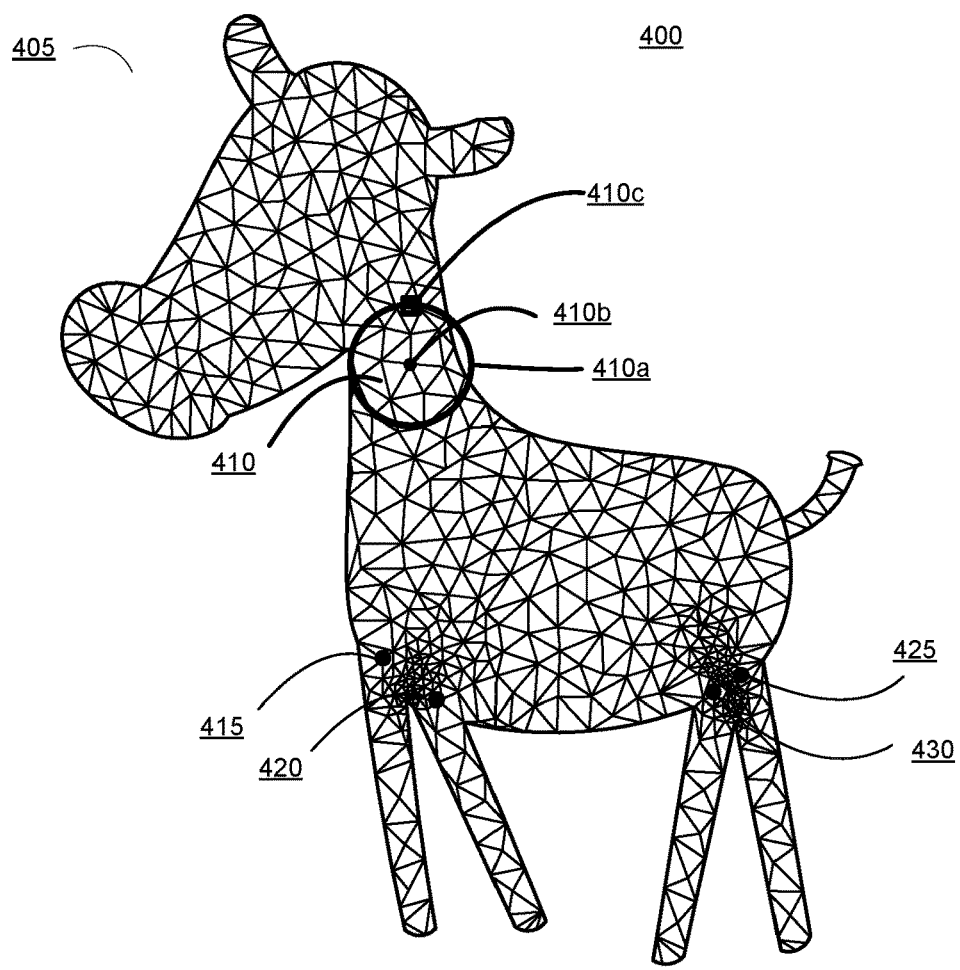
FIG. 4 is an example user interface illustrating a digital artwork with a bend handle, according to an implementation.

FIG. 4 is an example user interface 400 illustrating a digital artwork 405 with a bend handle control 410 for a bend handle and four other position handles 415, 420, 425, 430. The bend handle control 410 includes at least a stationary portion 410a and a moveable portion 410b. The stationary portion 410a may be configured to be manipulated by the user to specify a rotation value. For example, the user may rotate the stationary portion 410a, e.g., like turning a dial. In one example, the user may right-click-and-hold the stationary portion 410a and move the mouse up and down, which may cause the animation user interface 120 to simulate turning of the stationary portion 410a. The stationary portion 410a may be configured to manipulated by the user to specify a scale value. For example, the user may enlarge or contract the stationary portion 410a. In one example, the user may touch and hold the stationary portion 410a while dragging the touch away from the center of the stationary portion 410a. In another example, the user may click-and-hold the stationary portion while moving the mouse in a direction toward the center of the stationary portion 410a. In some implementations, the animation user interface 120 may provide a representation of the stationary portion 410a that indicates the scale. For example, the animation user interface 120 may provide a dashed ring (or shadow) outside the stationary portion 410a that indicates enlargement and a dashed ring inside the stationary portion 410a that indicates contraction.

In some implementations, the stationary portion 410a can include a selectable portion 410c. In some implementations, the selectable portion 410c may be used to provide the scale and/or rotation constraint. In some implementations, the selectable portion 410c may be used instead of the stationary portion 410a to provide the scale and/or rotation constraint. In some implementations, the selectable portion 410c may be used in addition to the stationary portion 410a to provide the scale and/or rotation constraint. For example, the user may touch-and-drag the selectable portion 410c away from or toward the center of the stationary portion 410a. Thus, the position of the selectable portion 410c may provide an indication of the scale value. Although illustrated as a ring, stationary portion 410a may take other forms, such as a slide control, an arc, rotation dial, a needle, etc.

The bend handle control 410 also includes a moveable portion 410b. The moveable portion 410b is not interactive and cannot be acted upon during a manipulation event. Put another way, the moveable portion 410b cannot be selected-and-dragged during a manipulation event. While not interactive, the moveable portion 410b separates from the stationary portion 410a during a manipulation event and moves around the display to illustrate the dynamic position of the bend handle. In other words, during a manipulation event when the user is interacting with the stationary portion 410a, the moveable portion 410b continuously moves as a new position is calculated based on the interaction, e.g., the rotation value, scale value, and/or shear value represented by the manipulation of the stationary portion 410a. In some implementations, the movable portion may include some indication of the rotation or scale applied from the stationary portion. In some implementations, the movable portion may display a path showing how the movable portion has moved from the initial position during the manipulation of the stationary portion.

Figure 5:
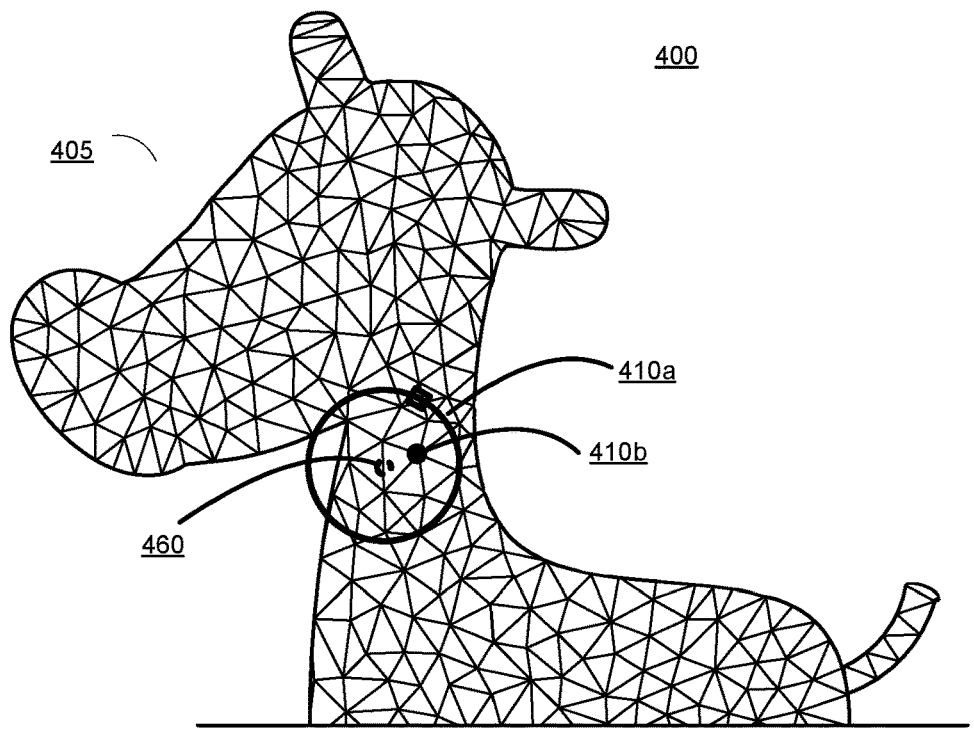
FIG. 5 is an example user interface illustrating separation of the moveable portion and the stationary portion of a bend handle control, according to an implementation.
Figure 6:
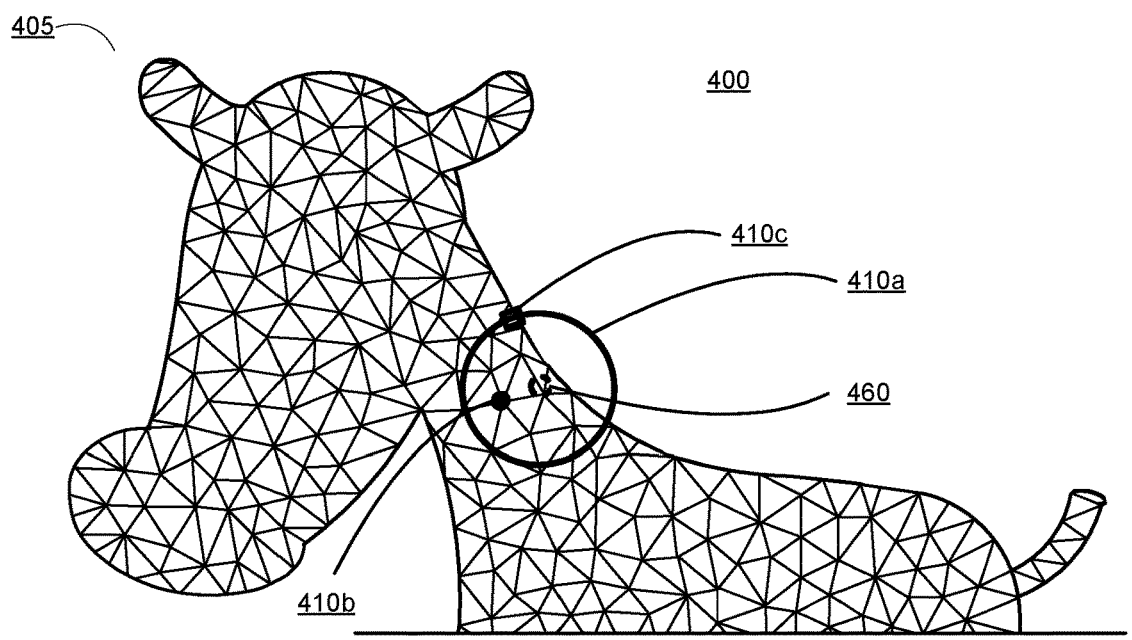
FIGS. 6 and 7 are example user interfaces illustrating the rejoinder of the stationary portion to the moveable portion of a bend handle control, according to an implementation.

FIG. 5 is an example user interface illustrating separation of the moveable portion 410b from the stationary portion 410a of the bend handle control 410 of FIG. 4 during a manipulation event. Although not illustrated in FIG. 5, the artwork 405 includes the additional position handles 415, 420, 425, 430 illustrated in FIG. 4. Thus, the constraints of the additional position handles 415, 420, 425, and 430 affect the rotation result illustrated in FIG. 5. In the example of FIG. 5, the user has rotated the stationary portion 410a clockwise to 14 degrees from the original position. Because of this change in rotation value, the system calculates a smooth deformation of the mesh and determines that the bend handle has moved from the initial position 460 (e.g., represented by display coordinates (x1, y1)), to a new position (e.g., display coordinates (x2, y2)). Accordingly, the moveable portion 410b is displayed at the new position. Comparison with the artwork of FIG. 4 illustrates that the new position and smooth deformation in the mesh results in the head of artwork 405 raising from its original position illustrated in FIG. 4. FIG. 6 also illustrates that the vertex of the mesh that the bend handle is associated with stays with the moveable portion 410b.

FIG. 6 is another example user interface illustrating the separation of the moveable portion 410b from the stationary 410a of the bend handle control 410 of FIG. 4. Although not illustrated in FIG. 6, the artwork 405 includes the additional position handles 415, 420, 425, 430 illustrated in FIG. 4. Thus, the constraints of the additional position handles 415, 420, 425, and 430 affect the rotation result illustrated in FIG. 6. In the example of FIG. 6, the user has rotated the stationary portion 410a counterclockwise to −19 degrees from the original position illustrated in FIG. 4. Because of this change in rotation value, the system calculates a smooth deformation of the mesh and determines that the bend handle 410 has moved from the initial position 460, e.g., at display coordinates (x1, y1) to a new position, e.g., at display coordinates (x3, y3). Accordingly, the moveable portion 410b is displayed at the new position. Comparison with the artwork 405 of FIG. 4 illustrates that the new position and smooth deformation in the mesh results in the head of the artwork 405 lowering from its original position illustrated in FIG. 4.

In some implementations, FIG. 6 may be a continuation of a manipulation event that also produced the interface of FIG. 5. In other words, during a single manipulation event the user may rotate the stationary portion 410a clockwise (illustrated in FIG. 5) and counterclockwise (illustrated in FIG. 6) without releasing the drag. Because the mesh deformation and dynamic position of the bend handle are calculated continuously during a manipulation event, the display may show a smooth movement, e.g., animation, during the manipulation event. This enables the user to see how the animation looks between different control values.

Figure 7:
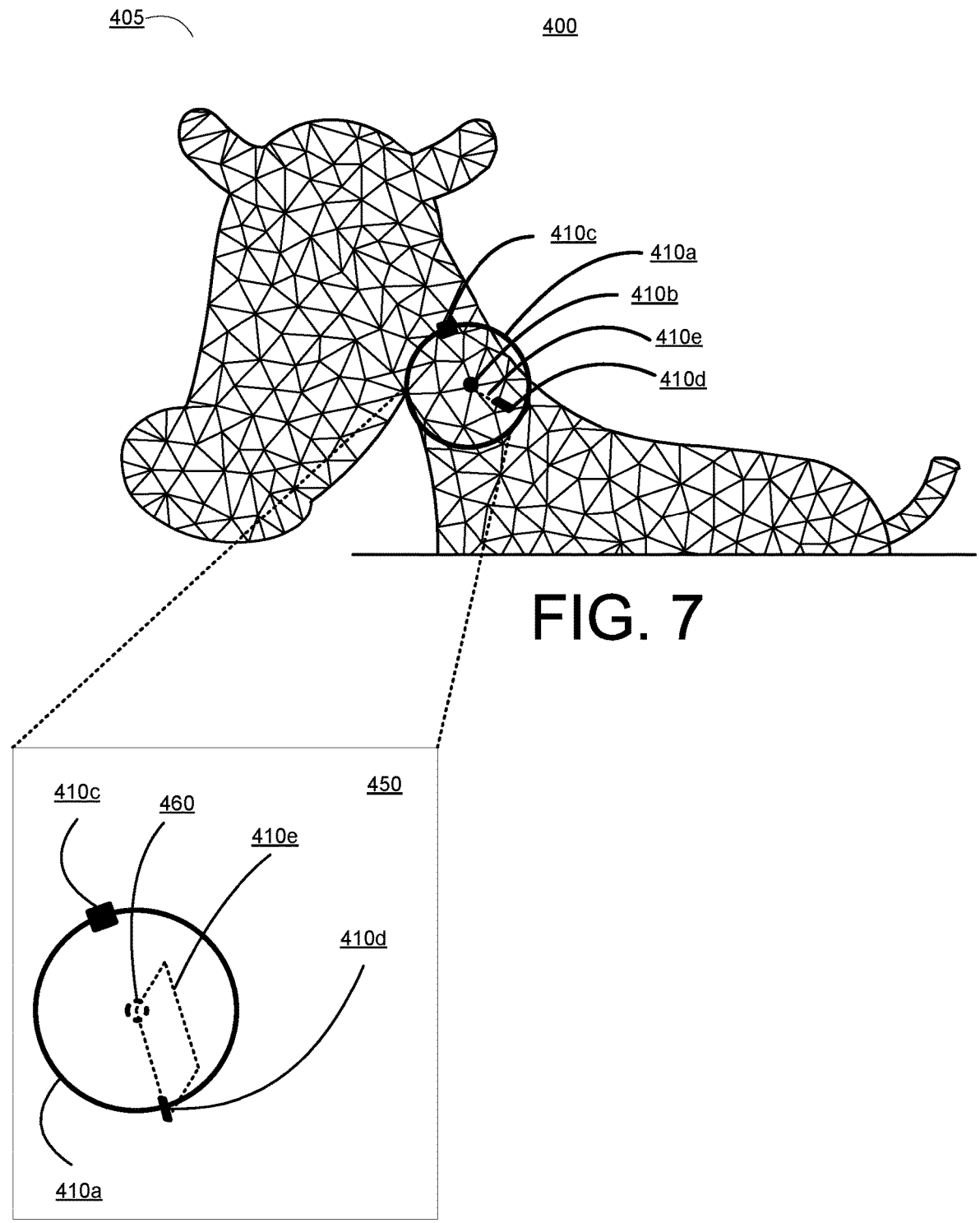

FIG. 7 is an example user interface illustrating the rejoinder of the stationary portion 410a to the moveable portion 410b of the bend handle control 410 illustrated in FIG. 6. In other words, after the user has rotated the stationary portion 410a to −19 degrees the user may end the manipulation event by releasing the input device (e.g., releasing the mouse button or raising a finger or stylus from the touch screen). At the termination of the manipulation event the stationary portion 410a snaps to the position of the moveable portion 410b, as illustrated in FIG. 7. This new position becomes the initial position for a subsequent manipulation event.

FIG. 7 also illustrates example user interface elements 410d and 410e used to provide a shear constraint. In this example implementation, the bend handle control 410 may provide a selectable portion 410d that is manipulated by the user to provide the shear constraint and a shear shadow portion 410e to show the shear amount and direction. Shear is a transformation that enables the user to skew a handle sideways in a certain direction. In some implementations, the stationary portion 410a may include a second selectable portion 410d. The second selectable portion 410d may be used by a user to provide a shear amount for the bend handle control 410. In some implementations, the second selectable portion 410d may be in addition to the selectable portion 410c. In some implementations, the user interface may include a shear shadow 410e portion. The shear shadow portion 410e may be selectable and used to rotate the shear angle. The user may drag the selectable portion 410d laterally to the shear direction to adjust the shear constraint. The user may drag the shear shadow portion 410e to adjust the shear angle. In FIG. 7, the selectable portion 410d and the shear shadow portion 410e are initially shown with no shear. The box 450 illustrated in FIG. 7 shows the selectable portion 410d and the shear shadow portion 410e during a manipulation, e.g., after the user has used the user interface elements 410d and 410e to provide a shear constraint. Although not illustrated in box 450 of FIG. 7, the moveable portion 410b would be located at a position calculated for the vertex (or vertices) associated with the bend handle 410 based on deformation of the mesh to conform to the shear constraint (value and angle) represented in box 450.

FIGS. 5-7 illustrate an example rotation constraint of a bend handle in the presence of other handles (e.g., handles 415, 420, 425, and 430 of FIG. 4). However, bend handles can operate in the absence of other handles. In such implementations, the result of a rotation constraint will rotate the entire mesh about itself. Likewise, a scale constraint will enlarge/contract the entire mesh. In other words, the result of a single bend handle and no other handles placed on an artwork is an affine transformation of the entire mesh. Additionally, implementations can include multiple bend handles and no position constrained handles. In such an implementation, a rotation or scale constraint for a first bend handle will be subject to the scale and/or rotation constraints of the other bend handles and transformation will occur about the average position of the center of the undeformed position of the handles.

Figure 8:
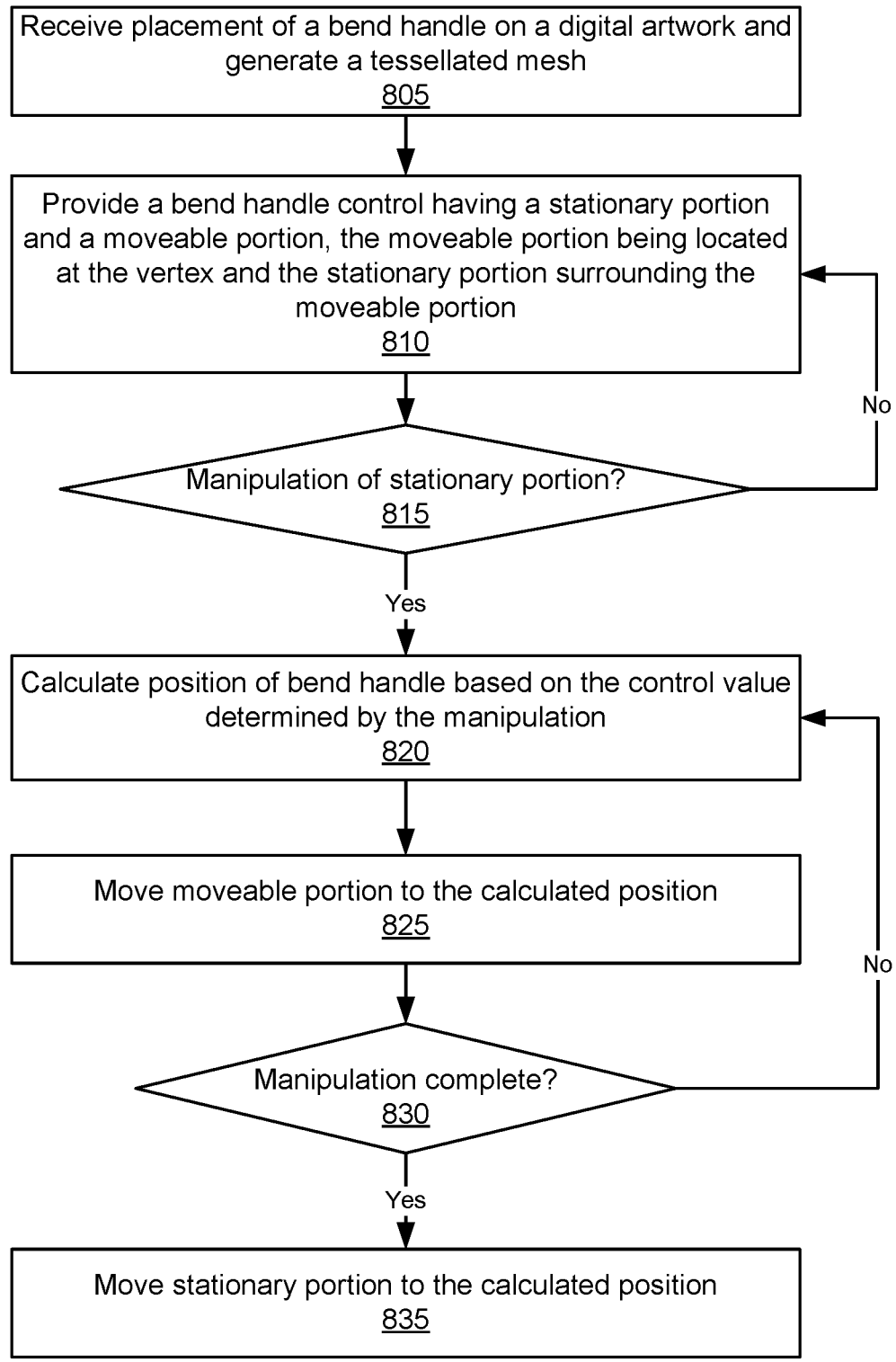
FIG. 8 is an example flowchart illustrating an example process performed by the system of FIG. 1.

FIG. 8 is an example flowchart illustrating an example process 800 for implementing a bend handle control, in accordance with disclosed implementations. Process 800 may be performed by a system such as system 100 of FIG. 1. Process 800 provides a unique user interface control with a stationary portion that does not change position during a manipulation event and a moveable portion that does, illustrating how the input represented by the manipulation affects the position of the bend handle.

Process 800 includes receiving placement of a bend handle on a digital artwork (805). In some implementations, the digital artwork will have an alpha boundary which is used to generate a tessellated mesh of triangles, with a plurality of vertices. If the artwork includes existing handles, the mesh is re-tessellated to account for the new handle. In generating the mesh, the system will generate a vertex for each handle. The system associates the bend handle with the created vertex beneath it which will be at the position on the display the user selects. In some implementations, the system has already generated the mesh and the handle is associated with a nearest vertex of the mesh. Vertices exist where the points of the triangles meet. The system, responsive to associating the bend handle with the vertex, provides a bend handle control for the bend handle (810). This control may appear whenever the bend handle has focus. In one example, the user may click on (touch) a bend handle icon to give the bend handle focus. In some implementations, multiple bend handles can have focus at the same time and will result in many handle controls being visible and can be manipulated simultaneously. For example, a user may hold down a select or control key and select multiple bend handles. As another example, in a multi-touch environment, the user may touch and hold multiple bend handles. In some implementations, if the user has multiple bend handles selected, manipulations done on one of the selected handles will apply to all other selected handles. In other words, if the user provides a rotation constraint, all selected bend handles will have that same rotation constraint. In some implementations (e.g. multi-touch), if the user has multiple bend handles selected, the user can manipulate the bend handles independently and simultaneously. For example, using four fingers a user may rotate one bend handle while simultaneously scaling another bend handle. Similarly, the user can simultaneously provide scale and rotation constraints for a bend handle, e.g., by using two fingers to rotate and scale a single handle. In some multi-touch implementations, the user can provide a shear constraint by moving one finger laterally away from two other fingers.

Once the bend handle has (or handles have) focus, the system provides the bend handle control. Thus, process 800 starting at step 810 can be repeated by giving the bend handle focus. Put another way, process 800 can be repeated starting at step 810 for each new manipulation event for an existing bend handle. Step 805 is only performed once for each bend handle, i.e., when the bend handle is added. The bend handle control includes a stationary portion and a moveable portion. Initially, e.g., before a manipulation event, the stationary portion and the moveable portion have the same position on the display. In some implementations, the stationary portion may surround the moveable portion. In some implementations, the stationary portion may be located above the moveable portion. In some implantations, the stationary portion may be below the moveable portion. In some implementations, the stationary portion may be next to the moveable portion. The stationary portion may be a ring. The stationary portion may be a ribbon. The stationary portion may be a slide bar. The stationary portion may be an arc. The stationary portion may be a dial. The stationary portion can be any control that simulates a user providing a rotation value via a pointing device, e.g., a mouse, stylus, digit, touch, multitouch, etc.

The system may determine whether the user has initiated a manipulation event using the stationary portion (815). For example, the user may select-and-hold (e.g., click-and-hold or touch-and-hold) the stationary portion. Such an input action indicates the start of a manipulation event. As long as the user does not release the stationary portion the manipulation event is ongoing. During the manipulation event the user may perform any number of drag inputs in any direction. Thus, a manipulation event may also be referred to as a select-and-drag (e.g., click-and-drag or touch-and-drag) event. During the manipulation event the system continuously calculates a position of the bend handle based on a control value determined by the manipulation (820). The control value may be a rotation value. In some implementations, the rotation value may be a positive value or a negative value. A positive value may indicate a degree of clockwise rotation from the starting position. A negative value may indicate a degree of counterclockwise rotation from the starting position. The rotation value may be any valid degree value. For example, a rotation of 270 is the same as a rotation of −90. Likewise, a rotation of 450 is the same as a rotation of 90. In some implementations the degree value may be limited to −180 and 180. In such implementations, a value greater than zero and less than 180 may be clockwise rotation and a value less than zero and greater than −180 may be a counterclockwise rotation. The control value may be a scale value. The control value may be a shear value. In some implementations, the control value may include both the rotation value and the scale value. In some implementations, the control value may include a rotation, scale, and shear value. In some implementations, the control value may include a scale value and a shear value, etc. After determining the control value for the bend handle, the system may calculate a position for the bend handle based on the control value. The position is also dependent on the placement of other handles on the mesh. As explained earlier, other handles may make the mesh around them resistant to certain types of deformation. The mesh vertices closest to the bend handle will be affected by the rotation, shear, and scale constraints more than vertices further from the handle. Moreover, the system will attempt to keep the shape of the mesh as close as possible to the original shape while still honoring the rotation, shear, and scale values. In effect, the bend handle enables rotation of the mesh around other position handles in the mesh, which results in more fluid and natural looking kinematic movement and can also simulate 3D effects.

Once a position of the bend handle has been calculated, the system moves the moveable portion to the calculated position (825), as well as redraws the artwork based on the smooth deformation of the mesh used to calculate the new position. The system continuously repeats steps 820 and 825 (830, No) until the user terminates the manipulation event (830, Yes), e.g., by releasing the bend handle. At the end of the manipulation event the system moves the stationary portion of the bend handle control to the new position (835). This position becomes the initial position of the bend handle should the user start a new manipulation event. As indicated above, steps 810 to 835 may be repeated for additional manipulation events.

With a bend handle, the dynamic position calculation provides a solution to traditional mesh deformation tools that require control points to specify both the location of the control, as well as any other constraints like scale and rotation. This limitation of conventional tools makes it difficult to modify a mesh without introducing artificial stretching in the mesh, and makes it hard to isolate specific deformations because the constraint needs to be positioned manually.

To add a perspective distortion (scale) animation, or simulating muscle flexing or character breathing (e.g., using a bend handle in the chest area of the artwork), or a tail wagging (rotation) on a figure that is animated and moving across the screen, current tools require extra effort, are not amenable to quick changes, and do not always yield the best results (e.g., introducing sharp, unnatural edges and other artefacts). In order to achieve scale and rotation movements, traditional controls that allow for such deformation need to be animated precisely in conjunction with any movement of the character. The separate deformations thus need to be correlated positionally. The result is time wasted in animation, extra effort needed to match the movement of the control with the movement of the character, stretching where the movement does not match correctly, and an inability to change those independent rotation and scale deformations if the positional animation of the character is ever changed.

Because bend handles are unconstrained positionally, a user can create expressive animations that affect the twist and bloat of different parts of the mesh, without animating the position directly. This novel handle is extremely useful for animating forward kinematic type limbs (like tails, head bobs, or tentacles), animating muscle flexing or breathing, and adding a perspective-like change to different parts of a character, like the head or arm, to simulate the head leaning in or turning left or right. Because the system can correlate the position with the movement of the artwork, the user provides less input but achieves a more realistic and organic animation in less time than with conventional tools. The more natural non-linear deformations due to the nature of the minimal deformation; bend handles may move in seemingly non-linear motion as they are animated, but the results are nearly always natural looking, predictable, and pleasing to the eye.

Another example advantage of the bend handle is illustrated by an amebae animation, which can be animated with a single position-constrained handle (e.g., the position is interactive and set by the user) multiple bend handles. Using this setup the user can simulate a complicated animation of a cell type organism with a few simple keyframes on the bend handles' rotation, shear, and scale. Finally, the bend handle can be used to simulate pseudo-depth, as one part of the mesh is scaled larger, the other can be scaled smaller, making it look like the object is changing perspectives or turning in 3D space. These deformations move intelligently and predictably with the mesh as the actual positional deformations are animated. The result is a higher quality animation in faster time (due to reduction in user input to generate the animation).

Figure 9:
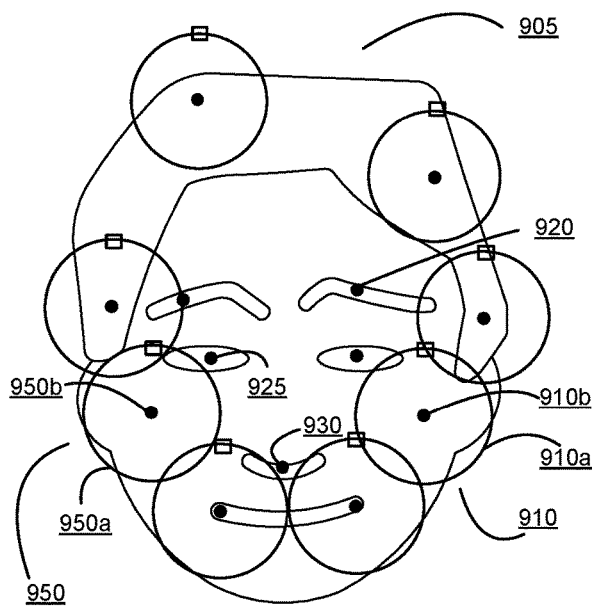
FIGS. 9-11 illustrate an example of using bend handles to simulate three dimensional effects in a two-dimensional artwork, according to an implementation.
Figure 10:
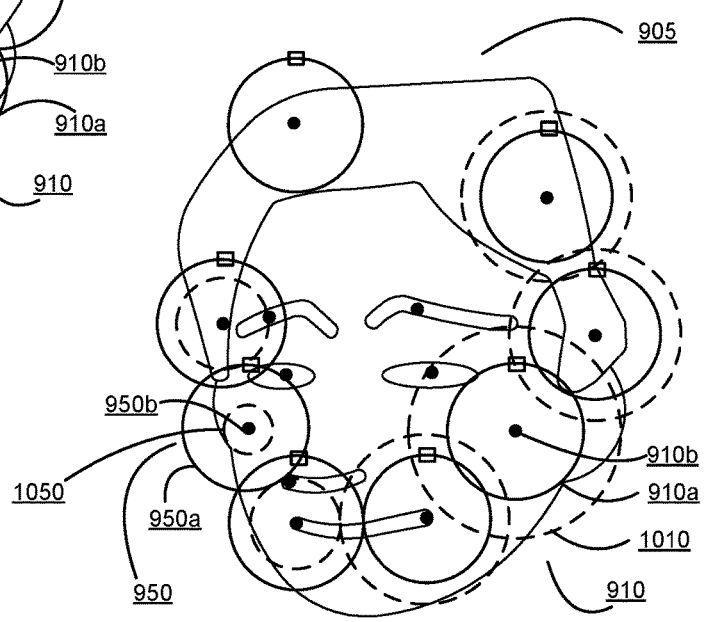
Figure 11:
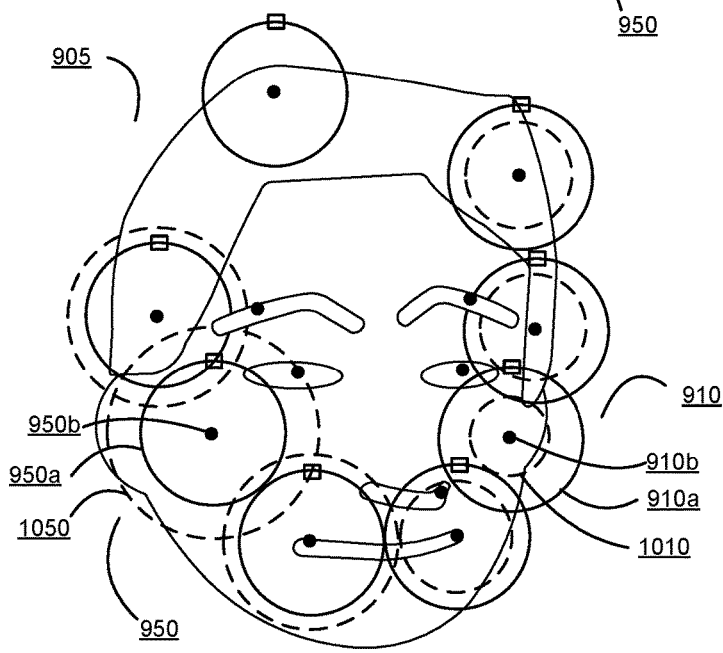

FIGS. 9-11 illustrate an example of using bend handles to simulate pseudo-depth, according to an implementation. In the example of FIG. 9 a digital artwork 905 is illustrated with several bend handles and position handles. Two of the bend handles are indicated by bend handle controls 910 and 950. The artwork also includes other handles, such as a position handles 920, 925, and 930. The artwork 905 of FIG. 9 is front facing. The user may use position handles to move the artwork 905 side-to-side. The user may use the bend handle controls, such as bend handle controls 910 and 950, to adjust the scale of the artwork. If the user moves the position handles, e.g., 920, 925, and 930, to the left, the user may scale the bend handle controls on the left side of the artwork 905 down and may scale the bend handle controls on the right side of the artwork 905 up, as illustrated in FIG. 10. In FIG. 10, the bend handle control 950 includes a shadow portion 1050, which is a representation of the scale value for the bend handle. Because the shadow portion 1050 is smaller than the stationary portion 950a, the scale is reduced or contracted. The amount of reduction may be indicated by the difference in size between the shadow portion 1050 and the stationary portion 950a as a percentage. FIG. 10 illustrates that other bend handle controls on the left side of the artwork have similarly been scaled down.

Bend handle control 910 on the right side of the artwork 905 has a shadow portion 1010 that is a representation of the scale value for the bend handle represented by bend handle control 910. Because the shadow portion 1010 is larger than the stationary portion 910a, the scale is enlarged or expanded. The amount of expansion may be indicated by the difference in size between the shadow portion 1010 and the stationary control portion 910a as a percentage. FIG. 10 illustrates that other bend handle controls on the right side of the artwork 905 has been similarly enlarged. The effect makes the artwork 905 appear to have turned to face left. FIG. 9 may represent a first keyframe in an animation and FIG. 10 may represent a second keyframe in an animation.

In FIG. 11 the user has moved the position handles to the right and has scaled down the bend handles on the left side of the artwork 905 and scaled up the bend handles on the right side of the artwork. Thus, shadow portion 1010 is now smaller than stationary portion 910a and shadow portion 1050 is now larger than stationary portion 950a. The effect makes the artwork 905 appear to be turned to face right. The user may make the arrangement of FIG. 9 a third keyframe and FIG. 11 a fourth keyframe in the animation. The software application program may, using the keyframes, cause the animation to appear to turn the head left to right, simulating pseudo-depth in a two-dimensional image.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

In one aspect, a system for animating artwork includes at least one processor and memory storing a digital artwork having an alpha edge and a mesh bounded by the alpha edge, the mesh comprising triangles with vertices within the alpha edge, the mesh having a bend handle associated with at least a first vertex of the vertices of the mesh. The system also includes memory storing instructions that, when executed by the at least one processor, cause the system to generate a user interface. The user interface displays the digital artwork and implements a bend handle control for the bend handle. The bend handle control includes a stationary portion and a moveable portion, the stationary portion enabling the user to select a control value for the bend handle, and the moveable portion moving, during a manipulation event of the stationary portion, to a deformed position determined from the control value and from a position of at least one other handle associated with at least a second vertex of the vertices.

These and other aspects can include one or more of the following features. For example, responsive to completion of manipulation of the stationary portion, user interface may snap the stationary portion to the deformed position. As another example, the deformed position may be determined from the control value and from the position of the at least one other handle to minimize deformation of the mesh. As another example, the stationary portion may include a selection portion capable of being selected and manipulated to set the control value. As another example, the control value may be a rotation value and the stationary portion includes a selection portion capable of being dragged along the stationary portion to set the rotation value, wherein the moveable portion moves during the dragging. As another example, the control value may be a scale value and the stationary portion includes a selection portion capable of being moved away from or toward the stationary portion to set the scale value. As another example, the control value may be a scale value and the bend handle control includes a shadow portion.

In one aspect, a method is provided for animating artwork based on handle movement of the artwork. The method includes providing a bend handle control for a bend handle associated with a vertex of a plurality of vertices of a mesh bounded by an alpha edge of the artwork, the artwork including a second handle associated with a second vertex of the plurality of vertices, the bend handle control including a stationary portion and a moveable portion at an initial position. The method also includes initiating a manipulation event to set a new control value for the bend handle via manipulation of the stationary portion, calculating a deformed position of the bend handle based on the new control value and constraints for the second handle, and moving the moveable portion to the deformed position.

These and other aspects can include one or more of the following features. For example, the method may also include, responsive to termination of the manipulation event, snapping the stationary portion to the deformed position. As another example, the new control value may be a new rotation value, a new shear value, and/or a new scale value. As another example, the deformed position becomes the initial position responsive to termination of the manipulation event and the method also includes receiving focus for the bend handle, providing a text entry control for specifying a new rotation value responsive to receiving focus, and responsive to receiving the new rotation value, calculating a position for the bend handle based on constraints for the second handle, the new rotation value, and the initial position. As another example, the new control value may be a new scale value and the manipulation moves away from the initial position to set the new scale value and the deformed position is calculated using the new scale value. As another example, the new control value may be a new rotation value and the manipulation moves a selection control around the stationary portion to set the new rotation value and the deformed position is calculated using the new rotation value. As another example, the new control value may be a scale value and the bend handle control includes a shadow portion displayed during the manipulation event. As another example, the stationary portion may be stationary relative to the initial position of the moveable portion.

In one aspect, a non-transitory computer-readable medium storing instructions is provided that, when executed by at least one processor, cause a computer to perform operations. The operations include receiving, via a user interface, placement of a bend handle on a digital artwork, creating a mesh of vertices and associating the bend handle with a first vertex of the vertices of the mesh, the digital artwork having a second handle associated with a second vertex of the vertices of the mesh. The operations also include, responsive to receiving the placement of the bend handle, providing a bend handle control in the user interface having a stationary portion and a moveable portion, the moveable portion being positioned at the first vertex and the stationary portion surrounding the moveable portion. The operations may also include, responsive to manipulation of the stationary portion by a user, calculating a new position for the bend handle that minimizes deformation of the mesh relative to the second handle and a control value determined by the manipulation, moving the moveable portion but not the stationary portion to the new position in the user interface, and repeating the calculating and moving until manipulation of the stationary portion is complete.

These and other aspects may include one or more of the following features. For example, the operations may also include, responsive to the manipulation of the stationary portion being complete, moving the stationary portion to the moveable portion. As another example, the manipulation of the stationary portion may be a rotation of the stationary portion and the control value is a rotation value. As another example, the manipulation of the stationary portion may be an expansion of the stationary portion and the control value is a scale value. As another example, the bend handle may be associated with the first vertex and a third vertex adjacent to the first vertex in the mesh. As another example, the manipulation of the stationary portion may provide a shear constraint for the bend handle.

According to one general aspect, a system includes at least one processor and memory storing instructions that, when executed by the at least one processor, cause the system to perform any of the operations or methods disclosed herein.

What is claimed is:

1. A system for animating artwork, the system comprising:
    at least one processor;
    memory storing a digital artwork having a mesh comprising vertices, the mesh having a bend handle associated with at least a first vertex of the vertices of the mesh; and
    memory storing instructions that, when executed by the at least one processor, cause the system to generate a user interface that displays the digital artwork and implements a bend handle control for the bend handle, wherein the bend handle control includes a stationary portion configured for manipulation by a user to select a rotation value for the bend handle, wherein the at least first vertex moves, during manipulation of the stationary portion, to a deformed position determined from the rotation value and from a position and rotation constraint of at least one other handle associated with at least a second vertex of the vertices and the stationary portion maintains an initial position during the manipulation.

2. The system of claim 1, wherein responsive to completion of the manipulation, the stationary portion snaps to the deformed position.

3. The system of claim 1, wherein the manipulation is a first manipulation and the bend handle control is further configured to select a shear value via a second manipulation by the user.

4. The system of claim 1, wherein the stationary portion includes a selection portion capable of being dragged in a circular motion to set the rotation value.

5. The system of claim 1, wherein the bend handle control includes a moveable portion marking the deformed position.

6. The system of claim 1, wherein the bend handle control is further configured for manipulation by the user to select a scale value.

7. The system of claim 1, wherein the bend handle control is associated with the first vertex and a third vertex of the vertices, the third vertex being adjacent to the first vertex.

8. A method for animating artwork based on handle movement of the artwork, the method comprising:
- providing a bend handle control for a bend handle associated with a first vertex of a plurality of vertices of a mesh of the artwork, the artwork including a second handle associated with a second vertex of the plurality of vertices, the bend handle control including a stationary portion at an initial position;
- initiating a manipulation event to set a scale value for the bend handle via manipulation of the stationary portion; and
- repeating, during the manipulation event: calculating a deformed position of the first vertex from the scale value and from a position and scale constraint for the second handle, and moving the first vertex to the deformed position,
- wherein the stationary portion maintains the initial position during the manipulation.

9. The method of claim 8, wherein the bend handle control includes a moveable portion marking the deformed position.

10. The method of claim 8, wherein the manipulation of the stationary portion includes dragging a portion of the stationary portion away from the first vertex or toward the first vertex.

11. The method of claim 8, wherein the deformed position becomes the initial position responsive to termination of the manipulation event and the method further comprises:
- receiving focus for the bend handle;
- responsive to receiving focus, providing a text entry control for specifying a scale value; and
- responsive to receiving the scale value, calculating a position for the first vertex based on constraints for the second handle, the scale value, and the initial position.

12. The method of claim 8, wherein the manipulation is a first manipulation and the stationary portion is further configured to select a shear value via a second manipulation.

13. The method of claim 8, wherein the manipulation is a first manipulation and the stationary portion is further configured to select a rotation value via a second manipulation.

14. The method of claim 8, wherein the bend handle control includes a shadow portion displayed during the manipulation event indicating a degree of scale.

15. The method of claim 8, wherein the stationary portion surrounds the first vertex.

16. A non-transitory computer-readable medium storing instructions that, when executed by at least one processor, cause a computer to perform operations including:
- receiving, via a user interface, placement of a bend handle on a digital artwork;
- generating a mesh of vertices and associating the bend handle with a first vertex of the vertices of the mesh, the digital artwork having a second handle associated with a second vertex of the vertices of the mesh;
- responsive to receiving the placement of the bend handle, providing a bend handle control in the user interface having a stationary portion at an initial position the stationary portion configured to select a shear value including a shear angle and shear amount via manipulation of the stationary portion; and
- during the manipulation of the stationary portion by a user, repeatedly:
  - calculating a new position for the first vertex that minimizes deformation of the mesh relative to the second handle and a shear value determined by the manipulation, and moving the first vertex to the new position in the user interface, the stationary portion remaining at the initial position.

17. The computer-readable medium of claim 16, wherein the manipulation is a first manipulation and the stationary portion is further configured to select a scale value or a rotation value via a second manipulation of the stationary portion.

18. The computer-readable medium of claim 17, wherein the stationary portion is configured to be manipulated via the first manipulation and via the second manipulation simultaneously.

19. The computer-readable medium of claim 18, wherein the shear value further includes a rotation.

* * * * *